United States Patent
Ichikawa

(10) Patent No.: US 7,172,648 B2
(45) Date of Patent: Feb. 6, 2007

(54) OIL-BASE BALLPOINT INK COMPOSITION AND OILY BALLPOINT PENS

(75) Inventor: Shuji Ichikawa, Tokyo (JP)

(73) Assignee: Mitsubishi Pencil Co., Ltd., Tokyo (JP)

( * ) Notice: Subject to any disclaimer, the term of this patent is extended or adjusted under 35 U.S.C. 154(b) by 1 day.

(21) Appl. No.: 10/503,393

(22) PCT Filed: Jan. 28, 2003

(86) PCT No.: PCT/JP03/00796

§ 371 (c)(1), (2), (4) Date: Aug. 3, 2004

(87) PCT Pub. No.: WO03/066760

PCT Pub. Date: Aug. 14, 2003

(65) Prior Publication Data

US 2005/0207824 A1    Sep. 22, 2005

(30) Foreign Application Priority Data

Feb. 4, 2002    (JP)    ............... 2002-027105

(51) Int. Cl.
C09D 11/18    (2006.01)
(52) U.S. Cl. ............... 106/31.58; 106/31.86; 106/31.59; 106/31.89
(58) Field of Classification Search ............ 106/31.58, 106/31.86
See application file for complete search history.

(56) References Cited

U.S. PATENT DOCUMENTS 4,525,216 A * 6/1985 Nakanishi .............. 106/31.67
5,655,847 A * 8/1997 Kobayashi et al. .......... 401/219
5,980,624 A * 11/1999 Ichikawa .................. 106/31.58

(Continued)

FOREIGN PATENT DOCUMENTS

EP    1 275 704 A1    1/2003

(Continued)

OTHER PUBLICATIONS

English Machine Translation of JP 7-157707 A.*

*Primary Examiner*—J. A. Lorengo
*Assistant Examiner*—Veronica Faison-Gee
(74) *Attorney, Agent, or Firm*—Foley & Lardner, LLP

(57) ABSTRACT

A ballpoint ink composition capable of preventing a blobbing phenomenon by controlling the volatility of the ink solvent to prevent extreme drying on the ball surface and control the internal cohesion of the ink is provided, which is an oil-based ballpoint ink composition comprising, as the main solvent, a solvent represented by the following chemical structural formula and further containing at least one or more surfactant selected from the group consisting of a polyoxyethylene alkyl ether, a fatty acid polyoxyethylene alkyl ether, a polyethylene glycol fatty acid ester, a polyoxyethylene glycerin fatty acid ester and a polyoxyethylene sorbitan fatty acid ester:

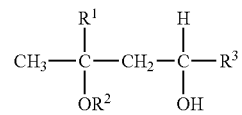

(wherein $R^1$, $R^2$ and $R^3$ each is independently H or $CH_3$).

6 Claims, 1 Drawing Sheet

U.S. PATENT DOCUMENTS

| | | |
|---|---|---|
| 5,993,098 A | 11/1999 | Osada |
| 6,786,956 B2 | 9/2004 | Ichikawa |
| 2002/0139280 A1 | 10/2002 | Ichikawa |
| 2003/0075074 A1* | 4/2003 | Ichikawa et al. ........ 106/31.43 |
| 2005/0228070 A1* | 10/2005 | Ichikawa et al. ........... 523/160 |

FOREIGN PATENT DOCUMENTS

| | | |
|---|---|---|
| JP | 07157707 A * | 6/1995 |
| JP | 2001-98204 A | 4/2001 |
| JP | 2003-41170 A | 2/2003 |

* cited by examiner

OIL-BASE BALLPOINT INK COMPOSITION AND OILY BALLPOINT PENS

TECHNICAL FIELD OF THE INVENTION

The present invention relates to an oil-based ballpoint ink composition which is suitably used as an oil-based ballpoint ink, causes no starving at the start of writing, gives smooth writing feel with a soft hand, quickly penetrates into the writing surface, exhibits excellent drying property at the pen tip and is prevented, as much as possible, from the extended wetting of ink to the pen tip (attachment blobbing) due to writing and in turn from blobbing of ink (line-drawing blobbing) on the paper surface, and also relates to an oil-based ballpoint pen using the ink composition.

BACKGROUND ART

An oil-based ballpoint pen generates a so-called dripping phenomenon by causing ink to leak out from the tip end, due to its simple structure, or a blobbing phenomenon of extended wetting to the tip or soiling the paper surface and these problems have been conventionally overcome by adjusting the ink viscosity to about 10,000 mPa·s, limiting the ink outflow mechanism in terms of the design of structure such as inner diameter of ink reservoir tube or clearance at the pen tip, imparting thixotropy, for example, by the addition of an inorganic filler particle to the ink, or adding a specific polymer, and thereby affecting the ink ejection. However, the ink solvent is usually a mixed solvent of a low-volatile aromatic glycol ether and an aromatic alcohol or the like and therefore, no significant progress has been achieved other than practicing the above-described operations.

An object of the present invention is to provide a ballpoint ink composition rendered capable of preventing the blobbing phenomenon by, unlike conventional methods, controlling the volatility of ink solvent to prevent extreme drying on the ball surface and control the internal cohesion of the ink.

DISCLOSURE OF THE INVENTION

In order to achieve the above-described object, it has been found that the problems can be solved by the oil-based ballpoint ink composition of the present invention having the following characteristic features. The present invention has been accomplished based on this finding.

(1) An oil-based ballpoint ink composition comprising, as the main solvent, a solvent represented by the following chemical structural formula:

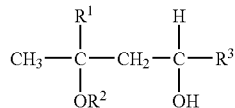

(wherein $R^1$, $R^2$ and $R^3$ each is independently H or $CH_3$) and further containing at least one or more surfactant selected from the group consisting of:
  a polyoxyethylene alkyl ether,
  a fatty acid polyoxyethylene alkyl ether,
  a polyethylene glycol fatty acid ester,
  a polyoxyethylene glycerin fatty acid ester, and
  a polyoxyethylene sorbitan fatty acid ester.

(2) The oil-based ball point ink composition as described in (1) above, wherein the addition molar number of ethylene oxide constituting the surfactant is from 3 to 50, the alkyl group contained in the surfactant is an alkyl group derived from an acid or an alcohol and having from 10 to 30 carbon atoms, and the surfactant is blended in a total amount of 0.1 to 20 mass % based on the ink composition.

(3) The oil-based ballpoint ink composition as described in (1) or (2) above, which comprises a surfactant selected from the surfactants described above and having an HLB of 7 to 16 and an oily appearance at 25° C.

(4) An oil-based ballpoint pen comprising an ink reservoir tube equipped with a ballpoint pen tip at the distal end, and an oil-based ballpoint ink composition housed in the ink reservoir tube, wherein the oil-based ballpoint ink composition is the oil-based ballpoint ink composition described above.

(5) The oil-based ballpoint pen as described in (4) above, which comprises an ink follower within the ink reservoir tube.

(6) The oil-based ballpoint pen as described in (4) or (5) above, wherein a metal or ceramic ball is used.

BEST MODE FOR CARRYING OUT THE INVENTION

Figure 1:
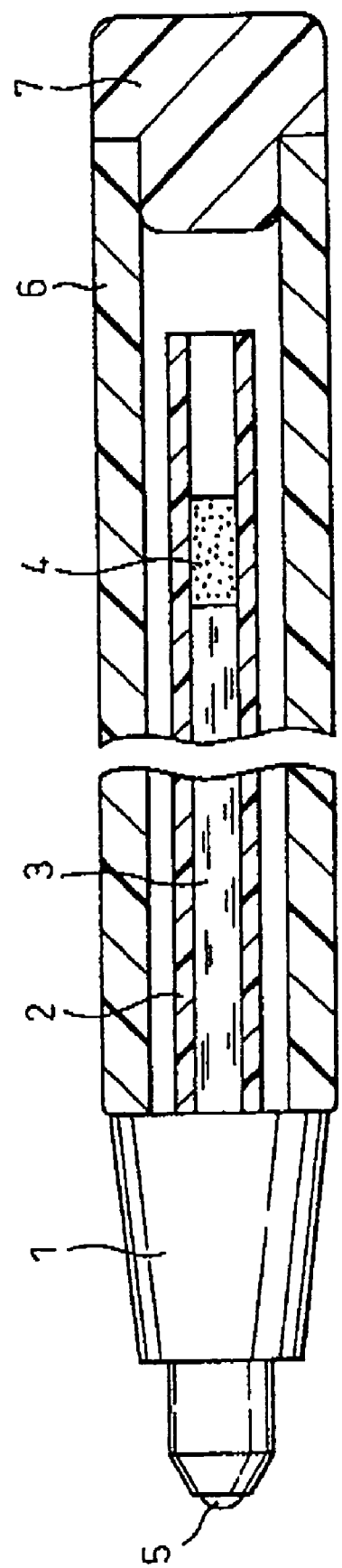
FIG. 1 is a schematic view of an oil-based ballpoint pen.

The solvent for use in the oil-based ballpoint ink composition of the present invention comprises, as the main solvent, a solvent represented by the following chemical structural formula:

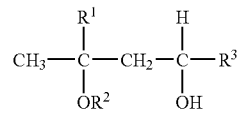

(wherein $R^1$, $R^2$ and $R^3$ each is independently H or $CH_3$). Examples of the solvent represented by this chemical structural formula include 3-methyl-1,3-butanediol, 1,3-butanediol, 3-methyl-3-methoxy-1-butanol and 3-methoxy-1-butanol. The "containing such a solvent as the main solvent" means that this solvent constitutes from 50 to 100 mass % of all solvents. The solvent as the main solvent is preferably used in an amount of 70 mass % or more. The oil-based ballpoint ink composition of the present invention comprises this main solvent, whereby an oil-based ink composition (non-aqueous ink composition) is constituted. This main solvent has a low viscosity, satisfactorily dissolves a dye and other components used for the ink, gives no adverse effect on the human body, and exhibits excellent properties such as high vapor pressure, desired volatility and low permeability for the ink reservoir tube resin.

The auxiliary solvent other than the main solvent is suitably a solvent selected from an alcohol, a polyhydric alcohol and a glycol ether.

The alcohol is specifically an aliphatic alcohol having 2 or more carbon atoms and examples thereof include various higher alcohols such as ethanol, n-propanol, isopropanol, n-butanol, isobutanol, tert-butyl alcohol, 1-pentanol, isoamyl alcohol, sec-amyl alcohol, 3-pentanol, tert-amyl alcohol, n-hexanol, methylamyl alcohol, 2-ethylbutanol, n-heptanol, 2-heptanol, 3-heptanol, n-octanol, 2-octanol, 2-ethylhexanol, 3,5,5-trimethylhexanol, nonanol, n-decanol, undecanol, n-decanol, trimethylnonyl alcohol, tetradecanol, heptadecanol, cyclohexanol, 2-methylcyclohexanol and benzyl alcohol.

Examples of the polyhydric alcohol include polyhydric alcohols having two or more carbons and two or more hydroxyl groups within the molecule, such as ethylene glycol, diethylene glycol, triethylene glycol, dipropylene glycol, 1,3-propanediol, 1,5-pentanediol, hexylene glycol and octylene glycol.

Examples of the glycol ether include methylisopropyl ether, ethyl ether, ethylpropyl ether, ethylbutyl ether, isopropyl ether, butyl ether, hexyl ether, 2-ethylhexyl ether, ethylene glycol monohexyl ether, ethylene glycol monophenyl ether, ethylene glycol mono-2-ethylbutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monobutyl ether, propylene glycol monomethyl ether, propylene glycol monoethyl ether, propylene glycol monopropyl ether, propylene glycol monobutyl ether, propylene glycol phenyl ether, propylene glycol tertiary-butyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monobutyl ether and tetrapropylene glycol monobutyl ether.

Among these auxiliary solvents, glycol ethers having from 2 to 7 carbon atoms are preferred because of their clear effect. In view of safety, peroral toxicity and the like, an organic solvent other than ethylene glycol derivatives is preferably used.

In addition to these solvents, a solvent described below may be added within the range of not impairing the stability of ink.

Esters may be used as the solvent and examples thereof include various esters such as propylene glycol methyl ether acetate, propylene glycol diacetate, 3-methyl-3-methoxybutyl acetate, propylene glycol ethyl ether acetate, ethylene glycol ethyl ether acetate, butyl formate, isobutyl formate, isoamyl formate, propyl acetate, butyl acetate, isopropyl acetate, isobutyl acetate, isoamyl acetate, methyl propionate, ethyl propionate, propyl propionate, isobutyl propionate, isoamyl propionate, methyl butyrate, ethyl butyrate, propyl butyrate, methyl isobutyrate, ethyl isobutyrate, propyl isobutyrate, methyl valerate, ethyl valerate, propyl valerate, methyl isovalerate, ethyl isovalerate, propyl isovalerate, ethyl trimethylacetate, ethyl trimethylacetate, propyl trimethylacetate, methyl caproate, ethyl caproate, propyl caproate, methyl caprylate, ethyl caprylate, propyl caprylate, methyl laurate, ethyl laurate, methyl oleate, ethyl oleate, triglyceride caprylate, tributylacetate citrate, octyl oxystearate, propylene glycol monoricinolate, methyl 2-hydroxyisobutyrate and 3-methoxybutyl acetate.

Also, diethers and diesters may be used as the solvent having no hydroxyl group within the molecule and specific examples thereof include ethylene glycol diethyl ether, ethylene glycol dibutyl ether, diethylene glycol diethyl ether, diethylene glycol dibutyl ether, diethylene glycol dimethyl ether and dipropylene glycol dimethyl ether.

The oil-based ink composition of the present invention is characterized by blending at least one or more surfactant selected from the group consisting of:

a polyoxyethylene alkyl ether:

(wherein R is an alkyl group and n is an integer of 1 or more), a fatty acid polyoxyethylene alkyl ether;

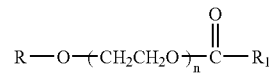

(wherein R and $R_1$ each is an alkyl group and n is an integer of 1 or more), a polyethylene glycol fatty acid ester:

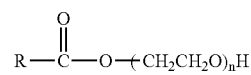

(wherein R is an alkyl group and n is an integer of 1 or more), a polyoxyethylene glycerin fatty acid ester:

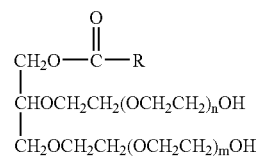

(wherein R is an alkyl group, and n and m each is an integer of 1 or more), and a polyoxyethylene sorbitan fatty acid ester:

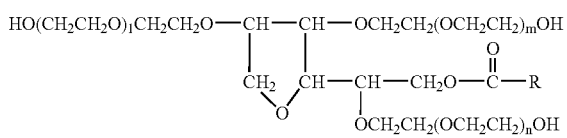

(wherein R is an alkyl group, and 1, m and n each is an integer of 1 or more).

The oil-based ballpoint ink composition of the present invention comprises the above-described main solvent and surfactant, whereby the volatility of the ink solvent can be controlled to prevent extreme drying on the ball surface and control the internal cohesion of the ink and the blobbing phenomenon can be thereby prevented. The reason why an excellent ink can be obtained according to the present invention without adjusting the ink viscosity to about 10,000 mPa·s, limiting the ink outflow mechanism in terms of the design of structure such as inner diameter of ink reservoir tube or clearance at the pen tip, imparting thixotropy, for example, by the addition of an inorganic filler particle to the ink, or adding a specific polymer, and thereby affecting the ink ejection, is considered to be as follows when a solvent having high volatility like the above-described main solvent is used, the extended wetting to the tip and in turn, attachment blobbing occurs less. Also, in such ink conditions, the addition of the above-described surfactant is expected to bring about a slight internal cohesion effect and this coincides with the tendency of very scarcely expressing a blabbing phenomenon. In addition, the surfactant prevents the ink at the tip end from hardening into a dry solid and does not greatly affect the solability of raw materials in the ink, so that an oil-based ballpoint ink composition assured of quick penetration of the ink into the writing surface and excellent drying property at the pen tip can be provided.

The surfactant used for the oil-based ballpoint ink composition of the present invention preferably satisfies the conditions that the addition molar number of ethylene oxide constituting the surfactant is from 3 to 50, the alkyl group, when contained, is an alkyl group derived from an acid or an alcohol and having from 10 to 30 carbon atoms, the total amount of the surfactants blended is from 0.1 to 20 mass % based on the entire ink composition, and each surfactant has an BLB (hydrophilic-lipophilic balance) of 7 to 16 and an oily appearance under the condition of 25° C. If the addition molar number of ethylene oxide is out of the range from 3 to 50, the carbon atom number of alkyl group is out of the range from 10 to 30 and the HLB is out of the range from 7 to 16, the effect of preventing blobbing decreases. Also, if the appearance state is not always oily under the condition of 25° C., an adverse effect is readily caused on the raw materials of the ink. The surfactant may have an appearance in a turbid oily state, but an oily state is preferred.

Specific examples of the polyoxyethylene alkyl ether include POE (6) oleyl ether [HLB=8, appearance; white turbid oily state], POE (5) nonylphenyl ether [HLB=8, appearance: colorless oily state], POE (10) nonylphenyl ether [HLB=12, appearance: colorless oily state], POE (11) nonylphenyl ether [HLB=12, appearance: colorless oily state], POE (12) nonylphenyl ether [HLB=13, appearance: white turbid oily state], POE (13) nonylphenyl ether [HLB=13, appearance: white turbid oily state], POE (5) octylphenyl ether [HLB=9, appearance: colorless oily state], POE (8) octylphenyl ether [HLB=11, appearance: colorless oily state], POE (10) octylphenyl ether [HLB=12, appearance: colorless oily state], POE (15) octylphenyl ether [HLB=14, appearance: colorless oily state], POE (5) lauryl ether [HLB=9, appearance: white turbid oily state] and POE (7) lauryl ether [HLB=10, appearance: white turbid oily state].

Specific examples of the fatty acid polyoxyethylene alkyl ether include POE (10) lauryl ether isostearate [HLB=7, appearance: pale yellow turbid oily state]. Specific examples of the polyethylene glycol fatty acid ester include POE (8) dilaurate [HLB=7, appearance: pale yellow oily state], POE (6) monoisostearate [HLB=8, appearance: pale yellow oily state], POE (12) monoisostearate [HLB=12, appearance: pale yellow oily state], POE (12) diisostearate [HLB=7, appearance: pale yellow turbid oily state], POE (6) monooleate [HLB=8, appearance: pale yellow oily state], POE (10) monooleate [HLB=11, appearance; pale yellow oily state] and POE (12) dioleate [HLB=7, appearance: pale yellow oily state].

Specific examples of the polyoxyethylene glycerin fatty acid ester include POE (5) glyceryl monoisostearate [HLB=7, appearance: pale yellow oily state], POE (6) glyceryl monoisostearate [HLB=8, appearance: pale yellow oily state], POE (8) glyceryl monoisostearate [HLB=9, appearance: pale yellow oily state), POE (10) glyceryl monoisostearate [HLB=10, appearance: pale yellow oily state], POE (15) glyceryl monoisostearate [HLB=12, appearance: pale yellow oily state], POE (20) glyceryl monoisostearate [HLB=14, appearance: pale yellow oily state], POE (25) glyceryl monoisostearate (HLB=15, appearance: pale yellow oily state], POE (30) glyceryl monoisostearate [HLB=16, appearance: pale yellow oily state], POE (20) glyceryl triisostearate [HLB=7, appearance; pale yellow oily state], POE (30) glyceryl triisostearate [HLB=10, appearance: pale yellow oily state], POE (20) glyceryl trioleate [HLB=7, appearance; pale yellow oily state] and POE (30) glyceryl trioleate [HLB=10, appearance: pale yellow oily state].

Specific examples of the polyoxyethylene sorbitan fatty acid ester include POE (20) sorbitan monolaurate [HLB=16, appearance: pale yellow oily state] and POE (20) sorbitan monooleate [HLB=14, appearance: pale yellow oily state].

In the oil-based ballpoint ink composition of the present invention, a resin is suitably used and examples of the resin which can be used include resins as represented by ketone resin, styrene resin, styrene-acryl resin, terpene phenol resin, rosin-modified maleic acid resin, rosin phenol resin, alkylphenol resin, phenol-based resin, styrene maleic acid resin, rosin-base resin, acyl-based resin, urea aldehyde-based resin, maleic acid-based resin, cyclohexanone-based resin and polyvinylbutyral, polyvinylpyrrolidone.

The blending amount of such a resin is preferably from 1 to 30 mass %, more preferably from 1 to 20 mass %, based on the ink composition. If the blending amount is less than 1 mass %, the adjustment of viscosity or abrasion at the pen tip becomes difficult, whereas if it exceeds 30 mass %, raw materials other than the resin may not be blended or an adverse effect is caused on the writing.

In the case of using a pigment for the coloring material of the ink composition of the present invention, a resin capable of dispersing the pigment may be selected from the resins described above and used as the dispersant. The dispersant is not limited in the type as long as it can satisfy the purpose, and may be an active agent or an oligomer. Specific examples of the dispersant include synthetic resins such as polyvinyl alcohol, polyvinylpyrrolidone, polyvinylbutyral, polyvinyl ether and styrene-maleic acid copolymer, keton resins, PO.EO adducts, and amine-based oligomers of polyester.

The colorant for use in the oil-based ballpoint ink of the present invention may be a dye or a pigment. The dye which can be used may be arbitrarily selected from dyes usually used for the dye ink composition, such as direct dye, acid dye, basic dye, mordant-acidic mordant dye, spirit-soluble dye, azoic dye, sulfidesulfide vat dye, vat dye, disperse dye, oil-soluble dye, food dye and metal complex salt dye, and inorganic or organic pigments usually used for the pigment ink composition. The blending amount of the dye is from 1 to 50 mass % based on the entire amount of the composition.

As for the pigment, a pigment sparingly soluble in the organic solvent used and giving an average particle size of 30 to 700 nm after dispersion is preferred. The pigment can be blended as needed in the range from 0.5 to 25 mass %, preferably from 0.5 to 20 mass %, based on the entire amount of the ink composition.

The pigments which can be used may be used individually or as a mixture of two or more thereof. Also, if desired, a dispersant, a dye or the like using an inorganic pigment may be added to an extent of not adversely affecting the dispersion stability. Other examples of the pigment include organic multicolor pigments comprising a resin emulsion obtained by the polymerization of styrene, acrylic acid, acrylic acid ester, methacrylic acid, methacrylic acid ester, acrylonitrile or olefin-based monomer, a hollow resin emulsion which swells in ink and becomes amorphous, or a dyed resin particle obtained by dyeing such an emulsion itself with a colorant.

In the case where the coloring material used in the present invention is a pigment, the pigment dispersed ink composition can be produced by conventionally known various methods. For example, respective components described above are blended and the blend is mixed and stirred by a stirrer such as dissolver or the blend is mixed and ground by a ball mill, a roll mill, a bead mill, a sand mill, a pin mill or the like and then subjected to centrifugal separation or filtration to remove coarse pigment particles, undissolved matters and mingled solid matters, whereby the composition can be easily obtained.

In the present invention, if desired, a rust inhibitor, a fungicide, a surfactant, a lubricant, a wetting agent and the like, which can be compatibilized without adversely affecting the ink, can be blended. In particular, for example, a fatty acid can be suitably used as the lubricant. Also, in view of product properties, a nonvolatile solvent or the like compatible with the main solvent can be blended as an additive for inhibiting the drying, within the range of not causing an adverse effect.

In the case of using the oil-based ink composition of the present invention for a ballpoint pen, an ink follower is preferably provided to the rear end part of the ballpoint pen. The solvent used in the oil-based ink composition of the present invention has volatility and therefore, an ink follower is added for the purpose of preventing volatilization, moisture absorption and ink leakage.

The ink follower must have low permeability and low diffusibility for the solvent used in the ink, and the base thereof is a nonvolatile or sparingly volatile fluid. Specifically, a non-silicon-based oil or fat basically having no compatibility with the solvent specified in claims, such as polybutene and liquid paraffin, can be used. In the case where the viscosity of such a substance is low, a thickener or a gelling agent is suitably used. Specific examples thereof include metal soaps, bentonites, fatty acid amides, hydrogenated castor oils, metal fine particles containing titanium oxide, silica, alumina or the like, celluloses, and elastomers.

In the case of using the ink composition of the present invention for a ballpoint pen, a metal ball usually used may be used, but a ceramic-made ball is more preferred because the starving phenomenon at the start of writing can be more successfully inhibited. Also, a ball having a small surface roughness like ceramic ball and capable of controlling the wetting of ink is preferred and as long as such properties are satisfied, a metal ball may be used. However, among the currently employed balls, a ceramic ball is preferred.

The reason why the ceramic ball has an effect on the ink starving phenomenon at the start of writing is considered as follows. The dry-solidified product of ink may coagulate and adhere to the ball at the tip distal end and in the periphery of the caulking part, but the ceramic ball has a property of strongly repelling the ink on the ball surface and causes the generation of such a dry-solidified product less, whereby particularly the ink using such a solvent having volatility as specified in claims can be prevented as much as possible from forming a dry-solidified product on the ball and in the periphery of the caulking part.

FIG. 1 schematically shows one example of the oil-based ballpoint pen. A pen tip (tip) 1 including a ball point 5 is connected with an ink reservoir tube 2, an ink 3 is housed in the ink reservoir tube 2, and an ink follower 4 is filled into the rear part of the ink 3 in the ink reservoir tube 2. As the ink 3 is consumed, that is, the residual amount of the ink 3 decreases, the ink follower 4 following the ink 3 moves toward the pen tip 1 in the ink reservoir tube. When the ink reservoir tube 2 is made of a transparent resin, the decrease of the ink can be viewed from the outside and this is preferred by users. In the present invention, the structure of the pen tip 1 is not particularly limited. Such a refill is combined with a case 6 and a rear cap 7 to form a ballpoint pen.

EXAMPLES

The present invention is described in greater detail below by referring to Examples, but the present invention is not limited to these Examples. A surfactant of 1) to 11) below was added to in an amount of 3% to Ink 1, 2 or 3 for evaluation and stirred.

1) POE (15) octylphenyl ether [HLB=14, appearance: colorless oily state] as polyoxyethylene alkyl ether
2) POE (10) lauryl ether isostearate [HLB=7, appearance: pale yellow turbid oily state] as fatty acid polyoxyethylene alkyl ether
3) POE (12) monoisostearate [HLB=12, appearance: pale yellow oily state] as polyethylene glycol fatty acid ester
4) POE (20) glyceryl monoisostearate [HLB=14, appearance: pale yellow oily state] as polyoxyethylene glycerin fatty acid ester
5) POE (20) sorbitan monooleate [HLB=14, appearance: pale yellow oily state] as polyoxyethylene sorbitan fatty acid ester
6) POE (100) hydrogenated castor oil [HLB=17, appearance; white wax state] as polyoxyethylene hydrogenated caster oil
7) POE (2) lauryl ether [HLB=9.5, appearance: colorless liquid] as polyoxyethylene alkyl ether
8) POE (3) cetylether stearate [HLB=0, appearance: pale yellow-white wax state] as fatty acid polyoxyethylene alkyl ether
9) POE (8) distearate [HLB=5, appearance; pale yellow-white wax state] as polyethylene glycol fatty acid ester
10) POE (60) glyceryl monostearate [HLB=19, appearance: pale yellow-white wax state] as polyoxyethylene glycerin fatty acid ester
11) POE (4) sorbitan tristearate [HLB=1, appearance: pale yellow wax state] as polyoxyethylene sorbitan fatty acid ester (Ink 1 for Evaluation)

| | |
|---|---|
| Spiron Black GMH Special [produced by Hodogaya Chemical Co., Ltd.] | 8% |
| Salt formation product of Basic Violet 4 and sodium alkyldiphenylether disulfonate | 20% |
| Polyvinylbutyral BM-1 [produced by Sekisui Chemical Co., Ltd.] | 5% |
| 3-Methoxybutanol | 10% |
| 3-Methoxy-3-methylbutanol | 51% |
| Neutralized phosphoric ester | 3% |

(Ink 2 for Evaluation)

| | |
|---|---|
| Valifast Violet #1702 [produced by Orient Chemical Industries Co., Ltd.] | 25% |
| Polyvinylbutyral BM-1 [produced by Sekisui Chemical Co., Ltd.] | 6% |
| Hilac 110H [produced by Hitachi Chemical Co., Ltd.] | 3% |
| 3-Methoxybutanol | 10% |
| 3-Methoxy-3-methylbutanol | 50% |
| Neutralized phosphoric ester | 3% |

(Ink 3 for Evaluation)

| | |
|---|---|
| Valifast Violet #1702 [produced by Orient Chemical Industries Co., Ltd.] | 25% |
| Polyvinylbutyral BM-1 [produced by Sekisui Chemical Co., Ltd.] | 3% |
| Hilac 110H [produced by Hitachi Chemical Co., Ltd.] | 8% |
| Benzyl alcohol | 32% |
| Diethylene glycol monophenyl ether | 32% |

(Examples 1 to 10) and (Comparative Examples 1 to 23)

TABLE 1

|  | Example | | | | |
|---|---|---|---|---|---|
|  | 1 | 2 | 3 | 4 | 5 |
| Ink 1 for Evaluation | 97% | 97% | 97% | 97% | 97% |
| Surfactant | 1) 3% | 2) 3% | 3) 3% | 4) 3% | 5) 3% |

TABLE 2

|  | Example | | | | |
|---|---|---|---|---|---|
|  | 6 | 7 | 8 | 9 | 10 |
| Ink 2 for Evaluation | 97% | 97% | 97% | 97% | 97% |
| Surfactant | 1) 3% | 2) 3% | 3) 3% | 4) 3% | 5) 3% |

TABLE 3

|  | Comparative Example | | | | | |
|---|---|---|---|---|---|---|
|  | 1 | 2 | 3 | 4 | 5 | 6 |
| Ink 1 for Evaluation | 97% | 97% | 97% | 97% | 97% | 97% |
| Surfactant | 6) 3% | 7) 3% | 8) 3% | 9) 3% | 10) 3% | 11) 3% |

TABLE 4

|  | Comparative Example | | | | | |
|---|---|---|---|---|---|---|
|  | 7 | 8 | 9 | 10 | 11 | 12 |
| Ink 2 for Evaluation | 97% | 97% | 97% | 97% | 97% | 97% |
| surfactant | 6) 3% | 7) 3% | 8) 3% | 9) 3% | 10) 3% | 11) 3% |

TABLE 5

|  | Comparative Example | | | | |
|---|---|---|---|---|---|
|  | 13 | 14 | 15 | 16 | 17 |
| Ink 3 for Evaluation | 97% | 97% | 97% | 97% | 97% |
| Surfactant | 1) 3% | 2) 3% | 3) 3% | 4) 3% | 5) 3% |

TABLE 6

|  | Comparative Example | | | | | |
|---|---|---|---|---|---|---|
|  | 18 | 19 | 20 | 21 | 22 | 23 |
| Ink 3 for Evaluation | 97% | 97% | 97% | 97% | 97% | 97% |
| Surfactant | 6) 3% | 7) 3% | 8) 3% | 9) 3% | 10) 3% | 11) 3% |

The inks obtained in Examples and Comparative each was filled and subjected to the following evaluation tests.

The ballpoint pen used for the tests had a polypropylene tube with an inner diameter of 1.60 mm and a stainless steel tip (the ball was made of a sintered hard alloy and had a diameter of 1.0 mm). The following evaluations were performed under conditions of 25° C. and 65% 30 minutes after the filling.

1) Evaluation 1 of Starving at Start of Writing (Sensory Evaluation)

The letters "社" were written and the degree of letter blurring was judged.

◎: Almost no blurring (the writing could be performed from the first or second line of "三")・.

○: Slight blurring (the second line of "三" was somewhat blurred but thereafter, no blurring).

Δ: Slightly heavy blurring (no blurring from "社")・ x: Very heavy blurring (writing of 社 could not be performed at all).

2) Evaluation 2 of Starving at Start of Writing (Mechanical Evaluation):

The pen was set at 60° under the conditions of 25° C. and 65%, a load of 200 g was applied thereto, and the paper contacting with the pen was moved at a rate of 2 m/min. The line drawn by this writing was observed. At this time, the distance of the line drawn from the starting point where the writing was started was measured. By preparing 5 pens, an average value thereof was used as the measured value.

◎: measured value ≦ 10 mm
○: 10 mm < measured value ≦ 50 mm
Δ: 50 mm < measured value ≦ 100 mm
x; 100 mm < measured value 3) Evaluation of Blobbing Phenomenon (Sensory Evaluation):

The pen was inclined at 60° under the conditions of 25° C. and 65% and writing of 30-cm straight line with use of a ruler was continuously performed three times. The degree of attachment of ink to the pen tip was observed.

○: Ink was less pooled and clean.
Δ: Ink was pooled and soiled.
x: Ink was much pooled and heavily soiled;

4) Evaluation of Low-Temperature Ink Stability (Sensory Evaluation)

The ink was filled in a 20 ml-volume glass bottle and left standing at 0° C. for 1 month. The presence or absence of insoluble matters at the bottom of the glass bottle was confirmed.

○; Utterly no problem.
Δ: Seemingly somewhat present.
x: Insoluble matters were confirmed.

5) Evaluation of High-Temperature Ink Stability (Sensory Evaluation)

The ink was filled in a 20 ml-volume glass bottle and left standing at 50° C. for 1 month. The presence or absence of insoluble matters at the bottom of the glass s bottle was confirmed.

○: Utterly no problem.
Δ: Seemingly somewhat present.
x: Insoluble matters were confirmed.

Evaluation Results:

TABLE 7

| Evaluation Method | Example | | | | | | | | | |
|---|---|---|---|---|---|---|---|---|---|---|
|  | 1 | 2 | 3 | 4 | 5 | 6 | 7 | 8 | 9 | 10 |
| 1) Evaluation 1 of Starving | ◎ | ◎ | ◎ | ◎ | ◎ | ◎ | ◎ | ◎ | ◎ | ◎ |
| 2) Evaluation 2 of Starving | ◎ | ◎ | ◎ | ◎ | ◎ | ◎ | ◎ | ◎ | ◎ | ◎ |
| 3) Evaluation of Blobbing | ◎ | ◎ | ◎ | ◎ | ◎ | ◎ | ◎ | ◎ | ◎ | ◎ |

TABLE 7-continued

| | Example | | | | | | | | | |
|---|---|---|---|---|---|---|---|---|---|---|
| Evaluation Method | 1 | 2 | 3 | 4 | 5 | 6 | 7 | 8 | 9 | 10 |
| 4) Low-Temperature Stability | ○ | ○ | ○ | ○ | ○ | ○ | ○ | ○ | ○ | ○ |
| 5) High-Temperature Stability | ○ | ○ | ○ | ○ | ○ | ○ | ○ | ○ | ○ | ○ |

TABLE 8

| Evaluation Method | Comparative Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| 1) Sensory Evaluation | ○ | Δ | Δ | ○ | ○ | Δ | ○ | Δ | Δ | ○ | ○ | Δ | ○ | ○ |
| 2) Mechanical Evaluation | ○ | Δ | Δ | ○ | ○ | Δ | ○ | Δ | X | ○ | ○ | Δ | Δ | Δ |
| 3) Evaluation of Blobbing | X | X | X | X | X | X | X | X | X | X | X | X | X | X |
| 4) Low-Temperature Stability | X | ○ | X | X | X | X | X | ○ | X | X | X | X | ○ | ○ |
| 5) High-Temperature Stability | ○ | ○ | X | ○ | ○ | X | ○ | ○ | X | ○ | ○ | X | ○ | ○ |

TABLE 9

| Evaluation Method | Comparative Example | | | | | | | | |
|---|---|---|---|---|---|---|---|---|---|
| | 15 | 16 | 17 | 18 | 19 | 20 | 21 | 22 | 23 |
| 1) Sensory Evaluation | Δ | X | X | Δ | X | X | X | Δ | X |
| 2) Mechanical Evaluation | X | X | X | X | X | X | X | X | X |
| 3) Evaluation of Blobbing | X | X | X | X | X | X | X | X | X |
| 4) Low-Temperature Stability | ○ | ○ | ○ | X | X | X | X | X | X |
| 5) High-Temperature Stability | ○ | ○ | ○ | X | X | X | X | X | X |

As apparent from these results, in comparison with the ink compositions of Comparative Examples 1 to 23, which were out of the scope of the present invention, the ink compositions of Examples 1 to 10 within the scope of the present invention were free from starving at the start of writing and, at the same time, were excellent in the prevention of blobbing while maintaining the stability of the ink.

INDUSTRIAL APPLICABILITY

According to the present invention, an oil-based ballpoint ink composition rendered capable of preventing the blobbing phenomenon by, unlike conventional methods, controlling the volatility of ink solvent to prevent extreme drying on the ball surface and control the internal cohesion of ink, is provided.

The invention claimed is:

1. An oil-based ballpoint pen ink composition, comprising at least one solvent selected from 3-methyl-1,3-butanediol, 1,3-butanediol, 3-methyl-3-methoxy-1-butanol and 3-methoxy-1-butanol, said at least one solvent being contained in an amount of at least 50 mass % of all solvents in said ink composition, said ink composition further containing at least one surfactant selected from the group consisting of:

a) a polyoxyethylene alkyl ether represented by the following formula:

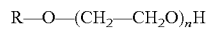

wherein R is an alkyl group and n is an integer of three or more, b) a fatty acid polyoxyethylene alkyl ether represented by the following formula;

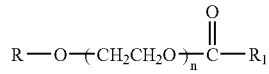

wherein R and $R_1$ each is an alkyl group and n is an integer of three or more, c) a polyethylene glycol fatty acid ester represented by the following formula:

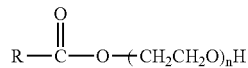

where R is an alkyl group and n is an integer of three or more, d) a polyoxyethylene glycerin fatty acid ester represented by the following formula;

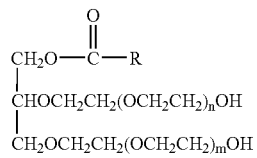

wherein R is an alkyl group, and n and m each is an integer of one or more, and the total of n and m is three or more, e) a polyoxyethylene sorbitan fatty acid ester represented by the following formula:

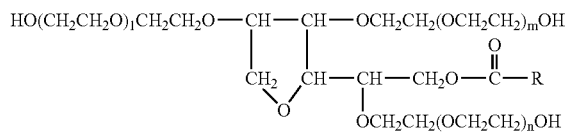

wherein R is an alkyl group, and l, m and n each is an integer of one or more, and f) and a surfactant selected from said surfactants and having an HLB of 7 to 16 and an oily appearance at 25° C.

wherein the addition molar number of ethylene oxide constituting said surfactant is from 3 to 50, the alkyl group contained in said surfactant is an alkyl group derived from an acid or an alcohol and having from 10 to 30 carbon atoms, and said surfactant is blended in an amount of 0.1 to 20 mass % in total based on the ink composition.

2. The oil-based ballpoint ink composition as claimed in claim 1, which further comprises, as an auxiliary solvent, at least one member selected from an alcohol, a polyhydric alcohol and a glycol ether.

3. The oil-based ballpoint ink composition as claimed in claim 1, which further comprises polyvinylbutylal in an amount of 1 to 30 mass % based on the ink composition.

4. An oil-based ballpoint pen comprising an ink reservoir tube equipped with a ballpoint pen tip at the distal end and an oil-based ballpoint ink composition housed in the ink reservoir tube, wherein said oil-based ballpoint ink composition is the oil-based ballpoint ink composition claimed in claim 1.

5. The oil-based ballpoint pen as claimed in claim 4, which comprises an ink follower within the ink reservoir tube.

6. The oil-based ballpoint pen as claimed in claim 4, wherein a metal or ceramic ball is used.

* * * * *